US007028253B1

(12) United States Patent
Lieberman et al.

(10) Patent No.: US 7,028,253 B1
(45) Date of Patent: Apr. 11, 2006

(54) AGENT FOR INTEGRATED ANNOTATION AND RETRIEVAL OF IMAGES

(75) Inventors: Henry Lieberman, Cambridge, MA (US); Elizabeth Rosenzweig, Newton, MA (US); Pushpinder Singh, Cambridge, MA (US); Mark D. Wood, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 917 days.

(21) Appl. No.: 09/685,112

(22) Filed: Oct. 10, 2000

(51) Int. Cl.
*G06F 15/00* (2006.01)

(52) U.S. Cl. ............... 715/512; 715/731; 715/529; 345/625; 345/634; 707/4

(58) Field of Classification Search ............ 715/531, 715/526, 512, 529, 731, 752; 707/4; 345/625, 345/634
See application file for complete search history.

(56) References Cited

U.S. PATENT DOCUMENTS

| 5,404,295 | A | * | 4/1995 | Katz et al. ............... 707/2 |
| 5,493,677 | A | | 2/1996 | Balogh et al. ............ 395/600 |
| 5,539,665 | A | | 7/1996 | Lamming et al. ......... 364/514 |
| 5,546,502 | A | | 8/1996 | Hart et al. ................ 395/12 |
| 5,742,808 | A | | 4/1998 | Hasuo ...................... 395/601 |
| 5,870,770 | A | * | 2/1999 | Wolfe ....................... 715/805 |
| 5,873,107 | A | * | 2/1999 | Borovoy et al. ......... 715/501.1 |
| 6,026,396 | A | | 2/2000 | Hall ........................ 707/4 |
| 6,108,674 | A | * | 8/2000 | Murakami et al. ........ 715/515 |
| 6,374,260 | B1 | * | 4/2002 | Hoffert et al. ............ 707/104.1 |
| 6,686,970 | B1 | * | 2/2004 | Windle ..................... 348/584 |

FOREIGN PATENT DOCUMENTS

| JP | 06-119405 | 4/1994 |
| JP | 08-314953 | 11/1996 |
| JP | 10-301953 | 11/1998 |

OTHER PUBLICATIONS

Henry Lieberman, "Autonomous Interface Agents", Proceedings of CHI '97, Atlanta, GA, Mar. 1997, pp. 67-74.*
"Remembrance Agent: A continuously running automated information retrieval system" by Bradley J. Rhodes and Thad Starner. Published in The Proceedings of The First International Conference on The Practical Application of Intelligent Agents and Multi Agent Technology (PAAM '96), pp. 487-495.

(Continued)

*Primary Examiner*—Stephen Hong
*Assistant Examiner*—Matthew Ludwig
(74) *Attorney, Agent, or Firm*—David M. Woods (57) ABSTRACT

A method for integrated retrieval and annotation of stored images involves running a user application in which text entered by a user is continuously monitored to isolate the context expressed by the text. The context is matched with metadata associated with the stored images, thereby providing one or more matched images, and the matched images are retrieved and displayed in proximity with the text. The context is then utilized to provide suggested annotations to the user for the matched images, together with the capability of selecting certain of the suggested annotations for subsequent association with the matched images. In a further extension, the method provides the user with the capability of inserting selected ones of the matched images into the text of the application, and further provides for automatically updating the metadata for the matched images.

17 Claims, 5 Drawing Sheets

OTHER PUBLICATIONS

"Letizia" An Agent That Assists Web Browing by Henry Lieberman. International Joint Conference on Artificial Intelligence. Montreal 1995.

"Autonomous Interface Agents" by Henry Lieberman. Proceedings of CHI '97. Atlanta, GA, Mar. 1997, pp. 67-74.

"Watson: Anticipating and Contextualizing Information Needs" by Jay Budzik and Kristian Hammond. Proceedings of the Sixty-second Annual Meeting of the American Society for Information Science. 1999.

"Multimedia Information Exploration" by Allan Kuchinsky. CHI '98 Workshop on Information Exploration, Palo Alto Laboratory, Inc. Palo Alto, CA (1998).

"Integrating User Interface Agents with Conventional Applications" by Henry Lieberman. Proceedings of the ACM Conference on Intelligent User Interfaces, San Francisco, Jan. 1998.

"The wearable remembrance agent: A system for augmented memory" by Bradley J. Rhodes. The Proceedings of The First International Symposium on Wearable Computers (ISWC '97), Cambridge, Mass, Oct. 1997, pp. 123-128.

"Shoebox: A Digital Photo Management System" by Timothy J. Mills, David Pye, David Sinclair,and Kenneth R. Wood. AT&T Laboratories Cambridge, 24a Trumpington Street, Cambridge CB2 1QA, England.

* cited by examiner

AGENT FOR INTEGRATED ANNOTATION AND RETRIEVAL OF IMAGES

FIELD OF THE INVENTION

The invention relates generally to the field of image processing, and in particular to the annotation and retrieval of selected images from a database.

BACKGROUND OF THE INVENTION

With the advent of digital photography, consumers now are capable of easily accumulating a large number of images over their lifetime. These images are often stored in "shoeboxes" (or their electronic equivalent), rarely looked at, occasionally put into albums, but usually laying around, unused and unlooked at for years.

The "shoebox problem" is particularly relevant, because "shoeboxes" are an untapped source for communicating shared memories that are currently lost. After initially viewing pictures (after they are returned from film developing or downloaded to a computer), many people accumulate their images in large informal, archival collections. In the case of hardcopy photos or printouts, these pictures are often accumulated in conveniently-sized shoeboxes or albums. Images in shoeboxes, or their electronic equivalent in folders or removable media, are often never (or very rarely) seen again, because of the difficulty of retrieving specific images, browsing unmanageably large collections and organizing them. Typically, any organizing apart from rough reverse-chronological order involves so much effort on the part of the user that it is usually never performed. Consequently, retrieval is an ad hoc effort usually based on laborious review of many, mostly non-relevant, images.

Potentially, of course, the images could be annotated with text labels and stored in a relational database and retrieved by keyword. However, until computer vision reaches the point where images can be automatically analyzed, most automatic image retrieval will depend on textual keywords manually attached to specific images. But annotating images with keywords is a tedious task, and, with current interfaces, ordinary people cannot reasonably be expected to put in the large amount of upfront effort to annotate all their images in the hopes of facilitating future retrieval. In addition, even if the images can be automatically interpreted, many salient features of images exist only in the user's mind and need to be communicated somehow to the machine in order to index the image. Therefore, retrieval, based on textual annotation of images, will remain important for the foreseeable future.

Furthermore, retrieval applications themselves are awkward enough that they often go unused in cases where the user might indeed find images from the library useful. For instance, the retrieval itself involves dealing with a search engine or other application that itself imposes overhead on the process, even if only the overhead of starting and exiting the application and entering keywords. Because of this overhead, opportunities to use images are often overlooked or ignored.

A primary opportunity for use of consumer picture-taking is in connecting people through pictures and stories they tell about events. Pictures convey emotions in a way that words cannot. For instance, imagine recently attending a wedding, and consider the resulting electronic mail message describing the event that might be sent to a friend. The mail would be greatly enhanced if the story could be illustrated by including pictures of the event, and perhaps also of pictures of related people, places, and events in the past. What is needed to accomplish this? Here is an example of what a person might have to do:

Take pictures at significant events in the wedding: exchanging vows, cutting the cake, the couple kissing, etc. Take pictures at each dinner table, people dancing, conversing, etc.

Get the pictures into the computer. This might involve: Removing the storage medium [memory card, floppy disk] from the camera and inserting it into a reader. Possibly connecting the reader device or the camera with a cable to the computer. Launching the communications software or setting a mode to perform the transfer. Selecting a place on the computer for the pictures to go. Selecting a name for the set of pictures so you don't forget what they are.

Launching an image viewing/manipulation/cataloging program [e.g., Adobe Photoshop™, PicturePage™]. Initially scanning the pictures and removing the "duds", exposures that were not successful. Possibly changing the file name of an individual picture to describe its contents. If you do have an image database, you may attach keywords to individual images or sets. Possibly performing image manipulation on the picture [cropping, adjusting brightness, etc.] using the same or separate application. Possibly printing hardcopy of images for storage or sending to others. Possibly e-mailing pictures to others or posting on Web pages.

Perhaps weeks or months later, you would like to use the images when composing an e-mail message to a friend or family member about the wedding. In addition to launching and operating the e-mail application itself, you must launch another application, an image viewer/catalog/search application. Perhaps you may search around in the file system to find a folder containing relevant images, either by browsing or retrieval by file name. Perhaps relevant images are stored on your own or acquaintances' Web pages, necessitating launching the Web browser and typing URLs or using search engines. Perhaps you may search the image database via keywords. You switch back and forth between applications as the need arises. If you succeed in finding a picture you cut the picture from the image application and paste it into the e-mail editor.

Nothing about this interaction is easy, and nothing would make this task easier to do the next time, for example, if you wanted to tell a related story to a different person in the future. One approach to alleviating this problem is by use of an agent, which is a program that performs some information gathering or processing task in the background. Typically, an agent is given a very small and well-defined task. More specifically, two types of agents that are useful in this connection are interface agents, software that actively assists a user in operating an interactive interface, and autonomous agents, software that takes action without user intervention and operates concurrently, either while the user is idle or taking other actions.

Autonomous interface agents have extended the field of natural language communication to the field of memory extension. For example, from the B. J. Rhodes et al. article "Remembrance Agent: A Continuously Running Automated Information Retrieval System" which appeared in the 1996 *Proc. of the First International Conference on the Practical Application of Intelligent Agents and Multi Agent Technology* (PAAM '96), pp. 487–495, it is known that a remembrance agent can automatically assist a system user by providing a continually running automated information retrieval system for monitoring a user's data entry and, thus, the thought processes of the user. For example, the system provides a remembrance agent which continuously monitors text in a window around the user's typing activity. It periodically performs a match of the text in the window against a database of stored personal documents, such as E-mail archives, based on the frequency of words common to the query text and the reference documents. It then presents at the bottom of the user's screen a ranked list of suggestions for the k most relevant entries to the current activity (k is set by the user). The user may then easily retrieve and view an entry's text. The remembrance agent does not require human preprocessing of the archive. However, the remembrance agent, which is designed to scan stored text entries, does not lend itself to retrieval of image materials and does not facilitate the annotation of such materials.

An autonomous interface agent (named "Letizia") for web browsing is described in several articles by H. Lieberman, including "Letizia: An Agent that Assists Web Browsing", which appeared in the International Joint Conference on Artificial Intelligence, Montreal, 1995 and "Autonomous Interface Agents", which appeared in Proceedings of CHI '97, Atlanta, Ga., March 1997, pp. 67–74. Letizia is a user interface agent that assists a user browsing the World Wide Web. Letizia records the URLs chosen by the user and reads the pages to compile a profile of the user's interests. Consequently, as the user operates a conventional Web browser, the agent tracks user behavior and attempts to anticipate items of interest by doing concurrent, automatic exploration of links from the user's current position. The agent automates a browsing strategy consisting of a best-first search augmented by heuristics inferring user interest from browsing behavior. Letizia then uses the browser's own interface to present its results, using an independent window in which the agent browses pages thought likely to interest the user. However, as with the remembrance agent, Letizia is not designed for the retrieval of image materials and does not facilitate the annotation of such materials.

In the article by J. Budzik and K. Hammond, "Watson: Anticipating and Contextualizing Information Needs", *Proc. Of the Sixty-second Annual Meeting of the American Society for Information Science*(1999), Information Today, Inc.: Medford, N.J., an information management assistant (nicknamed "Watson") detects opportunities for performing special-purpose searching in the context of document composition. For example, when a user inserts a caption with no image to fill it in their document, Watson uses the stop listed words in the caption to form a query to an image search engine. Users then can drag and drop images presented into their documents. However, as with the remembrance agent, there is no effort to facilitate the annotation of such materials.

It has been recognized that more effective information exploration tools could be built by blending cognitive and perceptual constructs. As observed by A. Kuchinsky in the article, "Multimedia Information Exploration", *CHI98 Workshop on Information Exploration*, FX Palo Alto Laboratory, Inc.: Palo Alto, Calif. (1998), if narrative and storytelling tools were treated not as standalone but rather embedded within a framework for information annotation and retrieval, such tools could be leveraged as vehicles for eliciting metadata from users. This observation of a potential path forward, however, is still largely divorced from the contextual use of the images in an application like e-mail and does not propose any observational learning from the user.

Despite the aforementioned suggestion to try a different approach, the conventional view remains that annotation and retrieval are two completely separate operations, to be addressed by applications operating independently from each other, and from any application in which the images might be used. This leaves the burden on the user to enter and leave applications when appropriate, and explicitly transfer data from one application to another, usually via cut and paste. Users are inclined to think about their own tasks, as opposed to applications and data transfer. Each user's task, such as sending an e-mail message, carries with it a context, including data being worked with, tools available, goals, etc., which tends to naturally separate from the context of other applications.

Consequently, there is a needed role for a user interface agent in facilitating, rather than fully automating, the textual annotation and retrieval process in connection with typical uses of consumer picture-taking. The role of the agent would lie not so much in automatically performing the annotation and retrieval but in detecting opportunities for annotation and retrieval and alerting the user to those opportunities. The agent should also make it as easy as possible for the user to complete the operations when appropriate. Indeed, there is particular need for a user interface agent that assists users by proactively looking for opportunities for image annotation and image retrieval in the context of the user's everyday work.

SUMMARY OF THE INVENTION

The present invention is directed to overcoming one or more of the problems set forth above. Briefly summarized, according to one aspect of the present invention, a method for integrated retrieval and annotation of stored images involves running a user application in which text entered by a user is continuously monitored to isolate the context expressed by the text. The context is matched with metadata associated with the stored images, thereby providing one or more matched images, and the matched images are retrieved and displayed in proximity with the text. The context is then utilized to provide suggested annotations to the user for the matched images, together with the capability of selecting certain of the suggested annotations for subsequent association with the matched images. In a further extension, the method provides the user with the capability of inserting selected ones of the matched images into the text of the application, and further provides for automatically updating the metadata for the matched images.

The approach taken by the present invention is to try to integrate image annotation, retrieval, and use into a single "application". Following a user-centered design process, it's the use that is most important; in one embodiment, text editing, in particular editing e-mail messages, was selected as an application for which picture retrieval from an image library might naturally find use. In this embodiment, a retrieval and annotation application is integrated to eliminate the confusing context switch of having separate applications.

Much of what we call "intelligence" in problem solving is really the ability to identify what is relevant and important in the current problem solving context and make it available for use in a just-in-time manner. The job of the agent in the integrated application is to make available and conveniently accessible the appropriate context for relating text and images.

For the task of editing e-mail messages, typing text descriptions often sets up a semantic context in which retrieval of pictures relevant to that context would be appropriate, that is, a context which corresponds to human cognition and represents the information in terms that are personally meaningful to the user. Similarly, seeing the pictures sets up a context for which some textual descriptions present in the current context may apply, setting up an opportunity for annotation. For these reasons, an interface is herein described to make taking advantage of these opportunities, in both directions, only a single click away.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

An advantage of the invention is the combination of annotation and retrieval in one easy process, which addresses the problem that users do not want to take the time and energy to annotate their images. The process is tedious, and most current applications are awkward and hard to use, so most images do not get annotated. In addition, the conventional view that annotations and retrieval are two separate operations, operating independently from one another, and any other applications they might use, creates a situation of high overhead for the user, and adds to their reasons for not performing the annotation.

A further advantage of the invention is in its ability to integrate annotation and retrieval with image use, thus repurposing the user's text editor input to provide real-time image recommendations and annotations.

More specifically, the invention presents a user interface agent that assists users by proactively looking for opportunities for image annotation and image retrieval in the context of the user's everyday work. One version of the invention sits in the user's e-mail editor, and continuously monitors typing. Continuous, ranked searches are automatically performed from an image library, and images relevant to the current text can be inserted in a single click. Descriptions of images entered for the purposes of storytelling in e-mail can be seamlessly employed as raw material for image annotation. While not completely automating the image annotation and retrieval process, the invention dramatically reduces user interface overhead, leading to better annotated image libraries and fewer missed opportunities for image use.

DETAILED DESCRIPTION OF THE INVENTION

Because data processing systems employing processing agents are well known, the present description will be directed in particular to attributes forming part of, or cooperating more directly with, the system and method in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system and method as described according to the invention in the following materials, software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figures 1, 3:
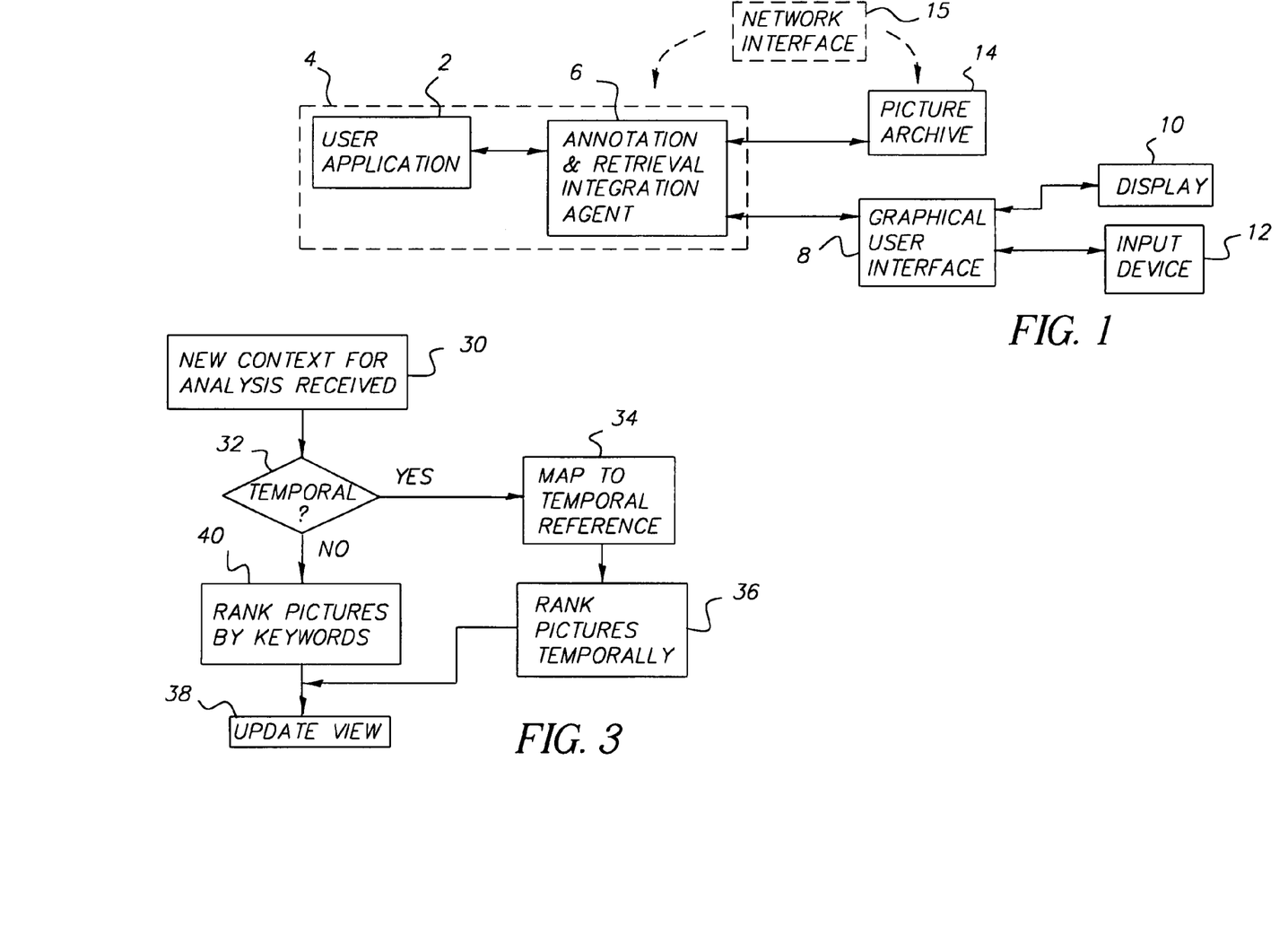
FIG. 1 is a functional block diagram of the software applications, including the annotation and retrieval agent, in an illustrative embodiment of the present invention.
FIG. 3 is a flow chart of the basic logic flow of the annotation and retrieval agent shown in FIG. 2.

Reference is initially directed to FIG. 1 which is a functional block diagram of the software applications in an illustrative embodiment of the present invention. The user application 2, e.g., an e-mail text editor, runs on a processor unit 4, which may be a conventional personal computer including a processor, memory, power supply, input/output circuits, mass storage devices and other circuits and devices typically found in a computer. In addition, the annotation and retrieval agent 6 runs on the processor unit 4. While it is not a requirement, in this illustrative embodiment, the two are shown as running on the same processor 4. The processor 4 is coupled to a graphical user interface 8 and a picture archive 14. The graphical user interface 8 provides a functional interface with a display 10, which serves as a visual interface to the user and may be any of the commonly used computer visual display devices, including, but not limited to, cathode ray tubes, matrix displays, LCD displays, TFT displays, and so forth, and with an input device 12, which is typically a keyboard, but could be other input devices such as a touch screen, character recognition system, mouse, track ball, touch pad, or other human interface device or peripheral.

The annotation and retrieval application communicates with a graphical material database. In the preferred embodiment, the database is the digital image archive 10, which stores an archive of still images; alternatively, or in addition, the database could include a digital video database storing motion video sequences. Such a database comprises a number of digital graphical and/or image materials that are accessible by a search function. Typically, the database is a relational database indexed by a plurality of indices. The conventional approach to search such a database is to provide one or more prioritized keywords. The database responds to such a request with a search result that lists a number of hits.

It is understood by those skilled in the art that databases such as the archive 10 may use more sophisticated indexing strategies and that any such database would be applicable to the present invention. For example, the images may be indexed based on image content descriptors, rather than keywords. Where keywords may describe the circumstances surrounding the image, that is, the who, what, where, when, and why parameters, content descriptors actually describe the data within the digital graphical material. Such factors are derived from the image itself and may include a color histogram, texture data, resolution, brightness, contrast and so forth. Besides typical image originating devices, such as a film scanner or a digital camera, the image material may be sourced from existing databases such as stock photo databases or private databases. It is also foreseeable that public sites will develop for dissemination of such graphical and/or image materials.

The picture archive 10 may reside with the processing unit 4, e.g., in the mass memory of a personal computer, or it may be external to the processing unit 4. In the latter case, the processing unit 4 may be coupled to the picture archive 10 over a network interface 15. The network interface 15 is here illustrated as being outside of the processing unit 4, but could be located inside the processing unit 4 as well. The network interface can be any device, or even a simple conductive circuit, to interface the processing unit 4 to an external network such as the Internet. However, the network utilized could be a private network, an intranet, a commercial network, or other network which hosts a database of graphical data. Respecting the network interface device 15, this could be a conventional dial-up modem, an ADSL modem, an ISDN interface, a cable modem, direct hardwire, a radio modem, an optical modem or any other device suitable for interconnecting the processing unit 4 to an external network, as herein described.

Figure 2:
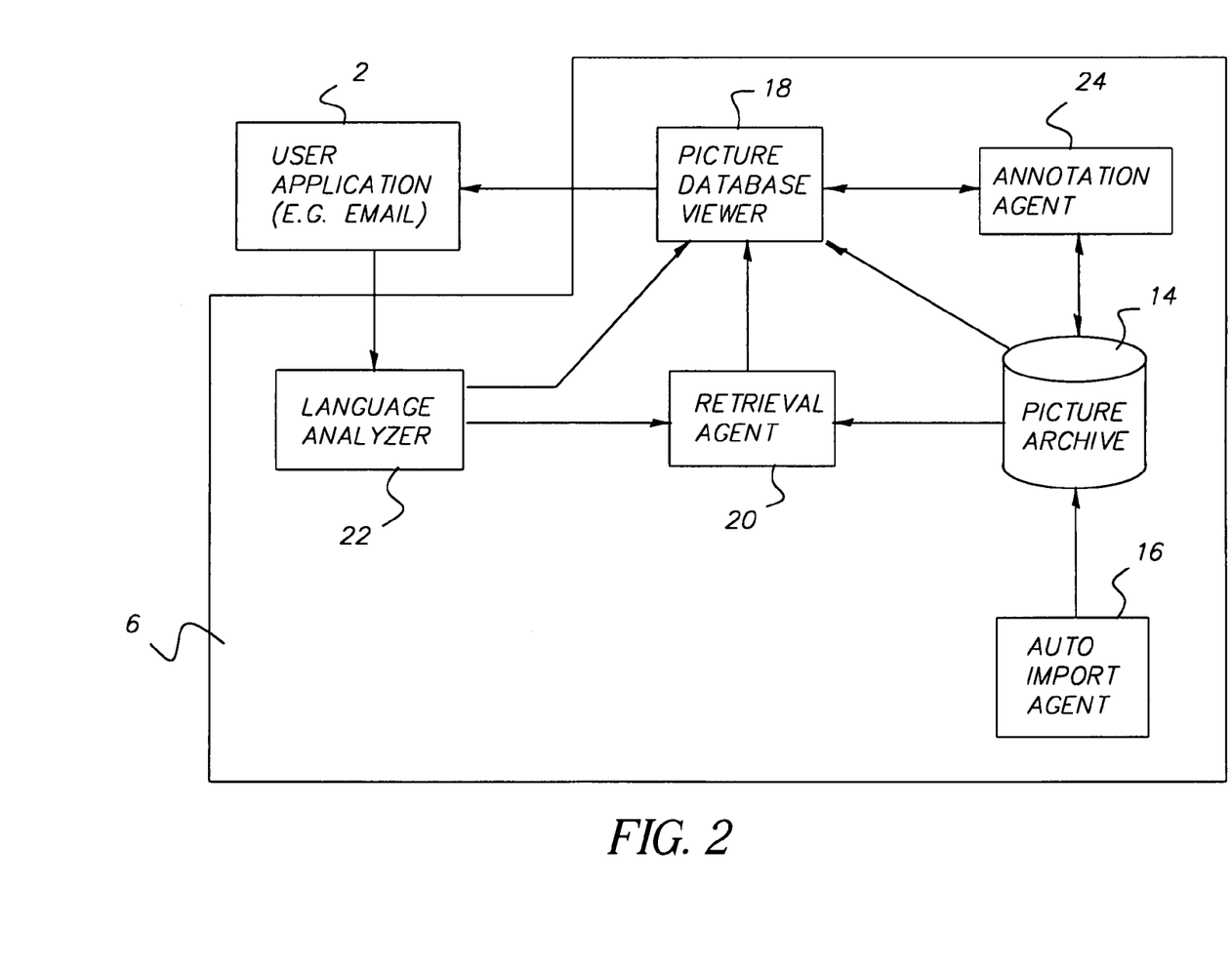
FIG. 2 is a functional block diagram of the annotation and retrieval agent in accordance with the invention.

Referring to FIG. 2, the annotation and retrieval integration agent (ARIA) 6 comprises several logical components, as follows. The picture archive 14, as was described earlier, provides storage of picture objects, including representations of images and their associated metadata, which includes keywords or other key information (e.g., content information) associated with the images. An auto import agent 16 periodically scans a specified source input for new picture content, and automatically incorporates this content into the picture archive 14. For example, the specified source input may be a removable memory, e.g., a flash card, from a digital camera, attached to the processing unit 4 or a connection over the network interface 15 to an external database. Clearly, other source inputs evident to one of ordinary skill may be employed in accordance with this embodiment. A picture database viewer 18 provides a navigational facility for viewing the contents of the picture archive 14 on the display 10, and displays both a thumbnail of a selected image and its associated metadata, such as associated keywords. Other agents, such as a retrieval agent 20 cause the view displayed to be updated. The picture database viewer 18 also allows pictures to dragged and dropped, or otherwise moved, into a window of the user application 2. The language analyzer 22 analyzes words developed by the user application 2, and provides context information to the retrieval agent 20 for selection of images from the archive 14.

The user application 20 may take different forms, such as e-mail, web page posting, word processing, presentation software, calendaring, and so on. For purpose of the following description, an e-mail text editor is used an exemplary application. The language analyzer 22 analyzes user input being entered to the target e-mail application and provides context information to the retrieval agent 20. In typical usage, common English words, such as articles, conjunctions, etc., are ignored. The retrieval agent 20 takes input from the language analyzer 22 and uses that input as context to rank the images in the database 14 according to relevance, and to update the view as shown on the display 10 by the picture database viewer 18. When the user invokes the input device 12 to drag and drop, or otherwise move, pictures from the updated view into the application window, context from around where the picture was dropped is analyzed by the language analyzer 22 to extract keywords that are automatically proposed for attachment to the picture in the picture archive 14.

The existing annotations, if any, in the picture archive 14 may be manually or automatically annotated by the current set of keywords extracted by the language analyzer 22. For instance, an annotation agent 24 may be explicitly invoked by the user from the picture database viewer 18, enabling the user to accept the proposed keywords, or manually edit and attach keywords to pictures. Alternatively, or in addition, the annotation agent 24 may automatically augment the picture archive 14 with all of the keywords extracted by the language analyzer 22. In the latter case, automatically extracted keywords could be distinguished from manually added keywords by assigning a lower confidence rating to the automatically extracted keywords. While these components make up the annotation and retrieval integration agent 6, this subsystem is designed to be integrated into one or more target applications 2, such as an email application.

FIG. 3 demonstrates the basic logic flow of a retrieval operation performed by the annotation and retrieval integration agent 6. In step 30, the retrieval agent 20 receives new context that has been extracted by the language analyzer 22. The context may be handled in different ways depending upon whether the context is temporal in nature (e.g., "yesterday" or "Sunday") or not. If the context is determined in step 32 to be a temporal reference, then the picture archive 14 is searched for a match in step 34. Digital pictures, for instance, are frequently captured with a date-time stamp as metadata. A match occurs if a picture is found that matches the referenced time point—i.e., either the same day or the same month. If a match is found, then pictures are ranked in step 36 according to their temporal distance from the referenced time point, and the view shown by the picture database viewer 18 on the display 10 is updated accordingly in step 38. For example, the higher ranked pictures can be brought up further toward the head of the list than lower ranked pictures.

If the context is determined in step 32 not to be a temporal reference, then pictures are ranked in step 40 according to their relevance to the specified context and the view shown by the picture database viewer 18 is updated accordingly in step 38. Ranking of pictures is determined by how many of the keywords provided in the context match keywords attached to the picture objects. The size of the context considered is a program variable. For example, if extracted context includes the words "beach" and "Florida", pictures having both keywords attached to them would be ranked highest, followed by pictures having just one of the keywords attached to them. Other rankings could be defined, for example, a spatial ranking (where pictures are ranked according to their distance from the reference place name brought up in the context extracted by the language analyzer 22). Moreover, since greater confidence is assigned to manually annotated images, the ranking could also take into account whether the extracted keyword was automatically provided or whether it was manually selected by the user. Additionally, since a picture may have a mixture of temporal and non-temporal references, the matching function may note the intersection of those pictures that matched according to the temporal context with those pictures that matched according to the keyword context. In this case, the pictures having the intersection might be retrieved and ranked, or the pictures having the intersection could be ranked higher than those not having both references.

Figure 4:
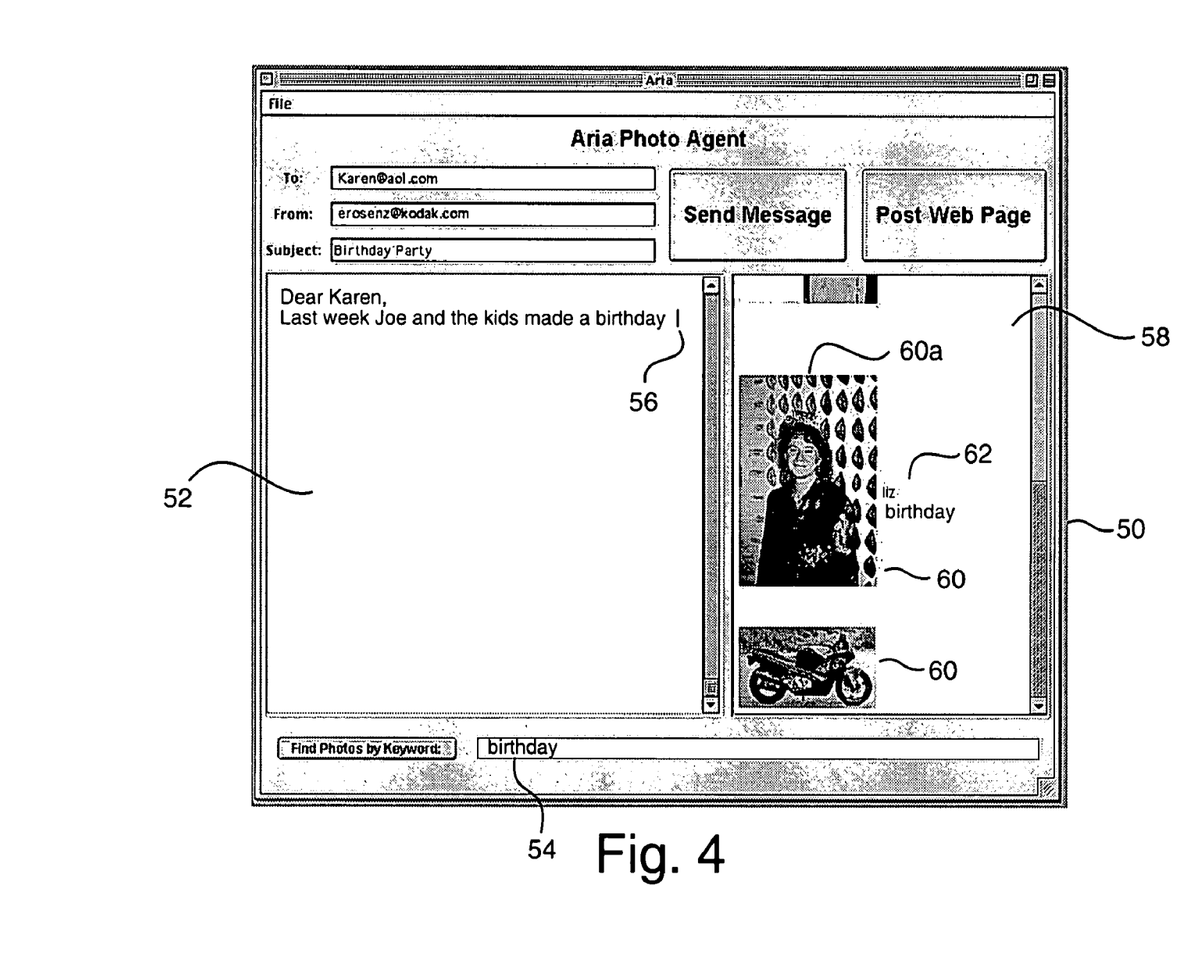
FIG. 4 is an illustration of a screen layout of the main window of an e-mail text editor, showing an application of the annotation and retrieval agent in accordance with the invention.
Figure 5:
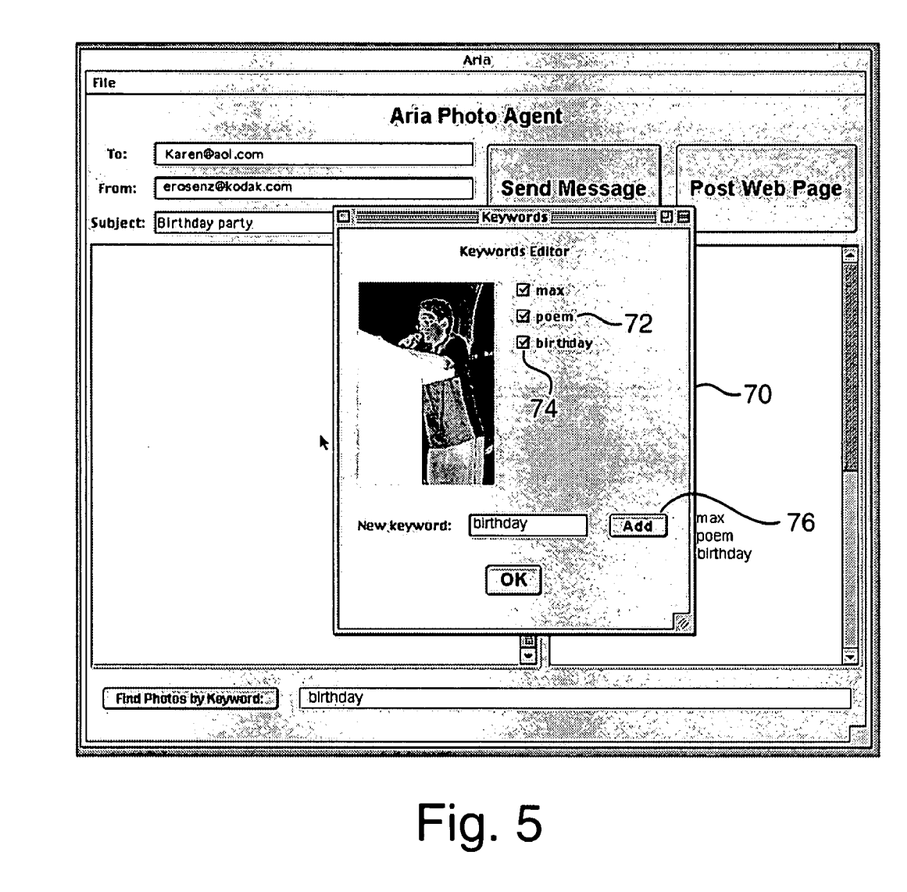
FIG. 5 is an illustration of a keyword dialog box appearing in the main window shown in FIG. 4.
Figure 6:
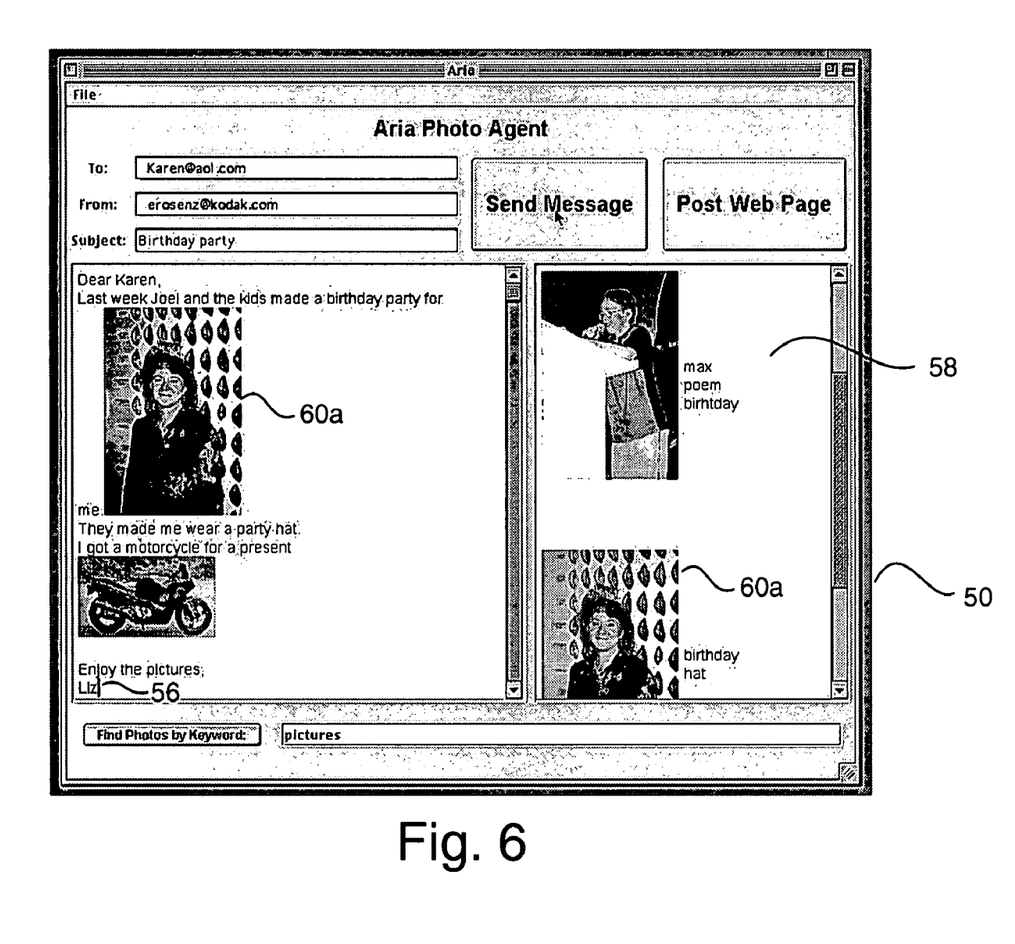
FIG. 6 is an illustration of the main window shown in FIG. 4 with a final e-mail written and ready to send.

An exemplary implementation of the annotation and retrieval integration agent 6 is shown in the screen configuration of FIGS. 4–6. The initial implementation comprises a standard text editor 50, such as the standard Java Swing text editor, coupled to a pane 52 containing a custom-built image retrieval and annotation application. At the bottom of the text editor 50, a retrieval term is displayed in a box 54, taken from the text surrounding the editor's cursor 56. To the right of the text editor 50, a column of retrieved images 60 is displayed in the retrieval window 58. This column is dynamically updated. To the right of each image 60, a list 62 of annotation keywords pertaining to that image appears. The user can freely type in the text editor 50, and the text editing actions are recorded by the annotation and retrieval integration agent 6, as shown in FIG. 4. The annotation and retrieval integration agent 6 is continuously running, and observes the user's typing actions in the text editor 50.

Input to the annotation and retrieval integration agent 6 is analyzed by the language analyzer 22 to extract keywords in the context surrounding the text cursor 56. While there are different conventional methods of performing the text analysis, a straightforward approach is to use common information extraction heuristics such as the term frequency-inverse document frequency (TFIDF) method of information retrieval, common word elimination, etc. For instance, the TFIDF method takes into account how important a term is in a query in addition to how well the term characterizes the email communications from the person relative to how rarely that term is used by all people communicating with the user. One or more of the closest keywords to the cursor 56 are continuously displayed in the box 54 below the text editor pane 52, where the number of keywords displayed depends upon the size of the context considered by the language analyzer 22. The keywords are used to query the image database in the picture archive 14, and a ranked list of images 60 is graphically displayed in the column 58 to the right, in order of relevance. This list is recomputed at every keystroke.

For example, as shown in FIG. 4, the user starts by typing an e-mail message into the text editor, Dear Karen,
Last week Joel and the kids made a birthday . . .

and the agent extracts the keyword "birthday". Assuming, for the moment, that at least one of the images happened to have been previously annotated with this term, this would be sufficient to retrieve a picture of the event, which would appear in the column 58 to the right of the text editor 50. It is likely to produce a picture 60a that would make a nice illustration for the e-mail message at this point, and the user may drag and drop the picture from the updated view in the column 58 into the application pane 52 of the text editor 50. Alternatively, for example, a single click on the picture 60a could insert the picture into the editor at the point of the cursor 56.

Then, with the image 60a inserted into the e-mail as shown in FIG. 6, the user continues to type the e-mail message into the text editor, Dear Karen,
Last week Joel and the kids made a birthday party for me. They made me wear a party hat. I got a motorcycle for a present . . .

and the annotation and retrieval integration agent 6 extracts the keywords "party", "hat", and "motorcycle". Assuming, as described above, that the images happened to have been previously annotated with these terms, this would be sufficient to retrieve pictures of the event, which would appear in the column 58 to the right of the text editor 50. As before, it is likely to produce one or more pictures that would make nice illustrations for the e-mail message at this point, and a drag and drop operation (or a single click on the picture) inserts the picture into the editor at the point of the cursor 56.

It is important to understand how different this interaction is from conventional image retrieval. For instance, there is no need to switch to an image retrieval application. No keyword queries were typed, and no file dialog boxes have to be pulled down. Moreover, no cut and paste was needed to use the image in the e-mail. Most importantly, the total user interaction preferably needs to be no more than a single motion, or one click. Of course, the desired image might not appear immediately, in which case we could scroll through the list until we found a suitable image, call up a dialog box to load other image sets, etc. Even in that case, we'd still be saving some interaction compared to the conventional approach, but what's important is that the most likely case is put right at our fingertips, so the average interaction would be much reduced.

There are other kinds of information that appear in the typed text that may be used to aid retrieval. One kind of information is a temporal reference. In many cases, the images imported by the auto import agent 16 include the date and time of capture, and the annotation and retrieval integration agent 6 may be designed to utilize such temporal information. For instance, typing "Last week . . . " may lead the system to determine the date range associated with last week, compare that range with the date time-stamped on every picture, and retrieve the pictures that are within that date range. This capability would ordinarily include a large vocabulary of time references, including specific and relative dates, intervals, "about", etc. Another kind of information is a location reference. Digital cameras are presently available that capture global positioning (GPS) data along with images. Typing a location, e.g., "San Francisco", could lead the system to look up the corresponding GPS coordinates and correlate this information with the location at which the pictures were taken, and then retrieve the images that have the same coordinate locations.

Supposing that the desired image had not yet been annotated, as would be the case if the images were being loaded for the first time by the auto import agent 16, for example, by inserting an image storage media, such as a compact flash card ordinarily used with a digital camera. As soon as the flash card media is inserted into the computer, the annotation and retrieval integration agent 6 immediately loads the images on the flash cards into the picture archive 14. The annotation and retrieval integration agent 6 is set up to automatically poll for incoming input every few seconds. This may seem like a small thing, but it removes the need for invoking a "Load Pictures" operation, waiting for a file dialog box to pop up, figuring out where the pictures should go in the file system, and what they should be called, and remembering the names so that you can retrieve them next time. The pictures just inserted are immediately brought to the top of the retrieval window 58, since it is likely the user will want to see them immediately.

While scrolling through and selecting an image to illustrate the opening sentence of the letter typed above, the user may note that the image now appears (after insertion) sitting in the text editor 50 next to text containing many keywords appropriate for describing it. This represents an opportunity to use the existing text to annotate the images so that retrieval will be easier next time. For instance, the user can drag any of the words "hat", "party", etc. from the text editor 50 to the image 60a to place an annotation on that image. For instance, as shown in FIG. 6, the user has elected to add the annotation "hat" to picture 60a. As shown in FIG. 5, the annotation and retrieval integration agent 6 can also respond to a match by displaying a dialog box 70 proposing candidate keywords 72 from the surrounding text (sometimes descriptions appear before, sometimes after the image, but usually close), so that the user can select one or more appropriate keywords at once (by checking the boxes 74), and avoid the irrelevant ones. Then, the selected keywords are added to annotations for that image by clicking on the "Add" button 76.

Again, the interaction is streamlined relative to what it would be in a conventional image annotation application, which would require typing, cut and paste, or selection from an external list of keywords, as well as a context-switch in and out of the annotation application.

In summary, the annotation and retrieval integration agent is a combination of a conventional E-mail editor and a conventional image retrieval application, with some features that make it more convenient for the user to perform some commonly used operations for image annotation and retrieval during composition of e-mail messages. The E-mail editor allows the user to type messages and sends them over networks such as the Internet. The image retrieval application stores a database of images and associates a set of keywords with each image. It allows the user to either to attach a new keyword to an image, delete an existing keyword, or to retrieve a set of images in the database based on a set of keywords. For each set of keywords, the image retrieval application returns an ordered list of images in an order where the best matches to the user's keywords appear first. To make combining pictures with e-mail messages more convenient, the annotation and retrieval integration agent retrieves pictures based on recently typed keywords in the e-mail message. Pictures may be dragged from the image retrieval application to the e-mail application, in which case they are inserted into the e-mail message. Words from the e-mail message may be dragged from the e-mail application to a picture in the image retrieval application, in which case they are associated with that picture in the image retrieval application database. If you left-click on a picture appearing in the e-mail message, a set of keywords taken from words surrounding the picture are displayed in check-boxes, and if the corresponding boxes are checked, that word is stored with that picture in the image retrieval application database.

The invention has been described with reference to a preferred embodiment. However, it will be appreciated that variations and modifications can be effected by a person of ordinary skill in the art without departing from the scope of the invention. For instance, while the annotation and retrieval integration agent operates in the preferred embodiment upon the context provided by keywords, it is equally possible for it to operate upon the context provided by phrases.

PARTS LIST 2 user application
4 processing unit
6 annotation and retrieval integration unit
8 graphical user interface
10 display
12 input device
14 picture archive
15 network interface
16 auto import agent
18 picture database viewer
20 retrieval agent
22 language analyzer
24 manual annotation agent
30 new context analysis step
32 temporal decision step
34 mapping to temporal step
36 temporal ranking step
38 update view step
40 keyword ranking step
50 text editor
52 pane
54 box
56 cursor
58 retrieval window
60 images
60a selected image
62 list of annotation keywords
70 dialog box
72 suggested annotations
74 annotation selection check box
76 add button

What is claimed is:

1. A method for utilizing images that are stored in a data base with an e-mail application in which text is input by a user into a message, said method comprising the steps of:
   a) providing metadata associated with the stored images;
   b) running an e-mail application in which text is entered by a user into a message window;
   c) continuously monitoring text typed by the user into the message window to isolate keywords in the text;
   d) matching and ranking the keywords with the metadata associated with the stored images, thereby providing one or more matched images that are ranked according to the keywords;
   e) retrieving and displaying the matched images alongside the message window in order of their rank; and
   f) providing the user with the capability of moving selected ones of the matched images into the message window and utilizing the context to automatically provide new keyword annotations for the matched images.

2. The method as claimed in claim 1, wherein the step of utilizing the context further includes automatically updating the metadata for the matched image with the annotations.

3. The method as claimed in claim 1, wherein the ranking is based on the number of matched keywords for each matched image.

4. The method as claimed in claim 1, wherein the keywords and metadata include temporal references and the ranking is based on the temporal distance between the keyword and the metadata associated with each matched image.

5. The method as claimed in claim 1, further comprising the step of utilizing the context to either automatically or manually select new keyword annotations for the matched images, wherein the ranking is based on a higher confidence level for the manually selected keyword annotations.

6. The method as claimed in claim 1, wherein the keywords and metadata include spatial or geographic references and the ranking is based on the spatial or geographic correspondence between the keyword and the metadata associated with each matched image.

7. A method for utilizing images that are stored in a data base with an e-mail application in which text is input by a user into a message, said method comprising the steps of:
   a) providing metadata associated with the stored images;
   b) running an e-mail application in which text is entered by a user into a message window;
   c) continuously monitoring text typed by the user into the message window to isolate keywords in the text;
   d) matching and ranking the keywords with the metadata associated with the stored images thereby providing one or more matched images that are ranked according to the keywords;
   e) retrieving and displaying the matched images alongside the message window in order of their rank; and
   f) providing the user with the capability of moving selected ones of the matched images into the message window and utilizing the context to provide new keyword annotations for the matched images, together with the capability of manually selecting certain of the annotations for subsequent association with the matched images in the data base.

8. The method as claimed in claim 7, wherein the step of utilizing the context further includes automatically updating the metadata for the matched image with the annotations.

9. A computer implemented autonomous agent stored on a computer readable medium and including programming instructions for use in interfacing a text-based application with a picture archive containing representations of images and metadata associated with the images said agent comprising:
   a language analyzer for continuously monitoring text entered by the user into the application and extracting keywords appropriate to the context surrounding the entered text;
   a retrieval agent for retrieving images from the archive on the basis of one or more matches between the extracted keywords and the metadata;
   an annotation agent for providing suggested annotations to the user for the matched images based on the extracted keywords, together with the capability of selecting certain of the suggested annotations for subsequent association with the matched images; and
   a picture database viewer for displaying the retrieved images to the user and for enabling the images to be incorporated into the application, as desired by the user.

10. The computer implemented autonomous agent stored on a computer readable medium as claimed in claim 9, wherein the retrieval agent ranks the retrieved images based on attributes of the keywords, and the picture database viewer displays the retrieved images in order of their ranking.

11. The computer implemented autonomous agent stored on a computer readable medium as claimed in claim 9, wherein the application is an e-mail application.

12. The computer implemented autonomous agent stored on a computer readable medium as claimed in claim 9, wherein the picture database viewer incorporates a retrieved image into the application by a drag and drop operation.

13. The computer implemented autonomous agent stored on a computer readable medium as claimed in claim 9, wherein the picture database viewer incorporates a retrieved image into the application by a one click selection of the image.

14. The computer implemented autonomous agent stored on a computer readable medium as claimed in claim 9, further comprising a manual annotation agent for adding annotations to the retrieved image and for storing the added annotations to the metadata stored in the archive.

15. The computer implemented autonomous agent stored on a computer readable medium as claimed in claim 9, wherein the retrieval agent retrieves images from the archive on the basis of matching between the extracted keywords and temporal metadata identifying the time and date when the images were captured.

16. The computer implemented autonomous agent stored on a computer readable medium as claimed in claim 9, further comprising an automatic import agent for automatically entering images into the archive from one or more specified image sources.

17. The computer implemented autonomous agent stored on a computer readable medium as claimed in claim 16, wherein the retrieval agent automatically retrieves the entered images and the picture database viewer automatically displays the entered images.

* * * * *